(12) United States Patent
Zhang

(10) Patent No.: US 8,444,730 B2
(45) Date of Patent: May 21, 2013

(54) EVEN-LOADING DPF AND REGENERATION THEREOF

(75) Inventor: Xiaogang Zhang, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 93 days.

(21) Appl. No.: 12/891,212

(22) Filed: Sep. 27, 2010

(65) Prior Publication Data

US 2011/0167800 A1 Jul. 14, 2011

(51) Int. Cl.
| | |
|---|---|
| B01D 50/00 | (2006.01) |
| B01D 39/14 | (2006.01) |
| B01D 39/06 | (2006.01) |
| B01D 24/00 | (2006.01) |
| B01D 41/00 | (2006.01) |
| B01D 45/00 | (2006.01) |
| B01D 46/00 | (2006.01) |
| B01D 49/00 | (2006.01) |
| B01D 51/00 | (2006.01) |
| B01D 46/38 | (2006.01) |
| F01N 3/00 | (2006.01) |

(52) U.S. Cl.
USPC ............ 55/282.3; 55/522; 55/523; 55/524; 422/169; 422/170; 422/171; 422/172; 422/177; 422/178; 422/179; 422/180; 422/181; 422/182; 60/297

(58) Field of Classification Search
USPC ..... 55/522–524, 282.3; 422/169–182; 60/297
See application file for complete search history.

(56) References Cited

U.S. PATENT DOCUMENTS

| | | | | |
|---|---|---|---|---|
| 5,318,755 | A * | 6/1994 | Kuivalainen et al. | 422/171 |
| 5,328,774 | A * | 7/1994 | Maus et al. | 428/593 |
| 5,591,413 | A * | 1/1997 | Toyoda | 422/180 |
| 6,464,744 | B2 * | 10/2002 | Cutler et al. | 55/482 |
| 6,764,527 | B2 * | 7/2004 | Ishihara et al. | 55/485 |
| 6,776,814 | B2 * | 8/2004 | Badeau et al. | 55/385.3 |
| 6,811,737 | B2 * | 11/2004 | Fukuta et al. | 264/482 |
| 7,090,714 | B2 * | 8/2006 | Otsubo et al. | 55/523 |
| 7,156,934 | B2 * | 1/2007 | Fukuta et al. | 156/89.22 |
| 7,204,965 | B2 | 4/2007 | Okawara et al. | |
| 7,249,455 | B2 * | 7/2007 | Tumati et al. | 60/287 |
| 7,491,373 | B2 * | 2/2009 | Ketcham et al. | 423/213.2 |
| 7,507,460 | B2 * | 3/2009 | Ichikawa et al. | 428/116 |
| 7,537,634 | B2 * | 5/2009 | Hatano et al. | 55/523 |
| 7,550,026 | B2 * | 6/2009 | Hayakawa | 55/523 |
| 7,611,560 | B2 * | 11/2009 | Ichikawa | 55/523 |
| 7,673,448 | B2 | 3/2010 | Voss et al. | |
| 7,772,151 | B2 * | 8/2010 | Li et al. | 502/339 |
| 7,972,400 | B2 * | 7/2011 | Mizuno et al. | 55/482 |
| 2002/0078667 | A1 * | 6/2002 | Ishihara et al. | 55/282.3 |
| 2002/0112472 | A1 * | 8/2002 | Tashiro et al. | 60/295 |
| 2004/0055287 | A1 * | 3/2004 | Sato et al. | 60/297 |
| 2004/0131772 | A1 * | 7/2004 | Yamada et al. | 427/230 |

(Continued)

FOREIGN PATENT DOCUMENTS

WO WO2009084567 * 7/2009

*Primary Examiner* — Amber Orlando
(74) *Attorney, Agent, or Firm* — Julia Voutyras; Alleman Hall McCoy Russell & Tuttle LLP

(57) ABSTRACT

A motor-vehicle engine system comprises an envelope configured to transmit exhaust. The envelope encloses a first array of filtration cells downstream of a second array of filtration cells. The system further comprises a fuel injector configured to increase a temperature in the envelope when soot is evenly distributed between the first and second arrays in order to address thermal gradients.

18 Claims, 6 Drawing Sheets

U.S. PATENT DOCUMENTS

| | | | |
|---|---|---|---|
| 2004/0161373 A1* | 8/2004 | Ichikawa et al. | 422/180 |
| 2005/0011174 A1* | 1/2005 | Hong et al. | 55/523 |
| 2005/0109022 A1* | 5/2005 | Nagaoka et al. | 60/297 |
| 2005/0217252 A1* | 10/2005 | Sato et al. | 60/295 |
| 2005/0284138 A1* | 12/2005 | Imai et al. | 60/295 |
| 2006/0107649 A1* | 5/2006 | Kamikawa et al. | 60/274 |
| 2006/0107658 A1* | 5/2006 | Hiranuma et al. | 60/297 |
| 2006/0260298 A1* | 11/2006 | Iida | 60/297 |
| 2007/0039295 A1* | 2/2007 | Ohno | 55/482 |
| 2007/0130925 A1* | 6/2007 | Ueno | 60/295 |
| 2007/0160508 A1* | 7/2007 | Doumeki et al. | 422/168 |
| 2007/0231539 A1 | 10/2007 | Miyairi et al. | |
| 2009/0145115 A1* | 6/2009 | Torisaka | 60/286 |
| 2009/0158719 A1* | 6/2009 | Hallstrom et al. | 60/297 |
| 2009/0223208 A1* | 9/2009 | Kojima et al. | 60/286 |
| 2010/0257830 A1* | 10/2010 | Mizutani | 55/523 |
| 2011/0167804 A1* | 7/2011 | Arvan | 60/286 |
| 2011/0214415 A1* | 9/2011 | Thomas | 60/297 |

* cited by examiner

EVEN-LOADING DPF AND REGENERATION THEREOF

TECHNICAL FIELD

This application relates to the field of motor vehicle engineering, and more particularly, to removing soot from motor-vehicle engine exhaust using a regenerable soot filter.

BACKGROUND AND SUMMARY

A diesel-engine system may include a soot filter or so-called diesel particulate filter (DPF). The DPF is configured to trap soot entrained in the engine exhaust. The DPF may include a honeycomb arrangement of hollow cells having exhaust-permeable walls. Each cell may extend in length from the inlet end of the filter to the outlet end of the filter. In a typical arrangement, each cell of the DPF is open at one end and closed at the other. Adjacent cells may be oriented alternately, such that a cell having an open inlet and closed outlet is adjacent one or more cells having closed inlets and open outlets. In this configuration, exhaust entering an open inlet of a cell is forced to cross one or more of the exhaust-permeable partitions into a cell having an open outlet.

As a DPF accumulates soot, its capacity for continued accumulation is naturally reduced. Further, a DPF operating with too much accumulated soot will impart excessive backpressure to the exhaust flow, which may degrade engine performance and fuel economy. Therefore, a DPF may be configured to support one or more regeneration modes, which restore the capacity of the filter for continued soot trapping. Some diesel-engine systems are configured to temporarily increase the exhaust temperature to burn away soot accumulated in the DPF. This is done by increasing the amount of energy released into the exhaust as heat. Accordingly, an engine may operate at reduced mechanical efficiency and fuel economy during DPF regeneration. For a given engine system, a DPF of greater capacity requires less frequent regeneration, and so provides improved fuel economy.

However, increasing the capacity of a DPF may require increasing its length, or its diameter, or both. Packing constraints naturally limit the diameter of a DPF in a motor-vehicle engine system, and thermal-management constraints may limit its length. During regeneration, soot accumulated in a DPF burns exothermically. If the accumulated soot is distributed unevenly with respect to the central axis of the filter, then the DPF may heat up unevenly—viz., a large thermal gradient may develop along the axis, resulting in unbalanced mechanical stress. Such stress is known to increase with the ratio of the length of the DPF to its diameter. When the ratio is too high, ring-off crack failure may occur during regeneration.

U.S. Pat. No. 7,204,965 describes a DPF in which a cell structure open on both ends is arranged upstream of the half-open honeycomb structure described above. This configuration addresses the issue of excessive backpressure caused by soot clogging the DPF inlet. The present application, by contrast, describes a DPF system that not only reduces backpressure due to inlet clogging, but also enables improved thermal management during regeneration. More specifically, the system here disclosed is configured so that soot accumulation in the DPF is roughly even in the axial direction at the time of regeneration. In this manner, thermal gradients and mechanical stresses during regeneration are reduced.

Accordingly, one embodiment provides an engine system comprising an envelope configured to transmit exhaust. The envelope encloses a first array of filtration cells downstream of a second array of filtration cells. Each cell of the first array has one open end and one closed end. Each cell of the second array has one or two open ends. The system further comprises a fuel injector configured to increase a temperature in the envelope when soot is evenly distributed between the first and second arrays. Another embodiment provides a method for removing soot from motor-vehicle exhaust using a regenerable soot filter, the filter comprising a first array of filtration cells enclosed in an envelope downstream of a second array of filtration cells. The method comprises trapping the soot in the first array at a first rate and trapping soot in the second array at a second rate, where the second rate decreases faster than the first rate. The method further comprises increasing the temperature in the envelope to oxidize the soot when the soot is evenly distributed between the first and second arrays.

The summary above is provided to introduce in simplified form a selected part of this disclosure, which is further described hereinafter. It is not meant to identify key or essential features of the claimed subject matter. Rather, the claimed subject matter is defined only by the claims and is not limited to implementations that solve any disadvantages noted herein.

DETAILED DESCRIPTION

Figure 1:
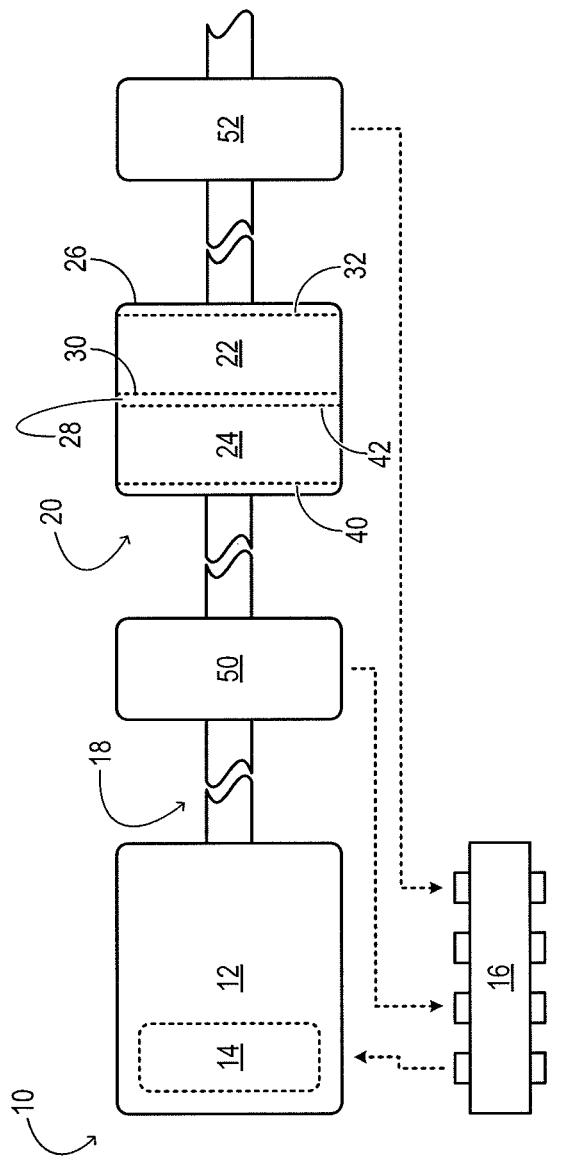
FIG. 1 schematically shows aspects of an example engine system in accordance with an embodiment of this disclosure.

The subject matter of this disclosure is now described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 schematically shows aspects of an example engine system 10 in one embodiment. The engine system includes engine 12, which admits air and fuel and generates mechanical power for driving a motor vehicle. In the illustrated embodiment, electronic fuel injectors 14 controllably admit fuel to the engine. The electronic fuel injectors operate in response to control signals from electronic control system 16. The electronic control system may be any electronic control system of engine system 10 or of the motor vehicle in which the engine system is installed.

In combusting fuel and generating mechanical power, engine 12 also discharges exhaust. This exhaust may be discharged from an exhaust manifold of the engine via exhaust conduit 18. Through the exhaust conduit, the exhaust flows to various engine-system components. For example, the exhaust conduit may conduct some or all of the exhaust to an exhaust-driven turbine. The turbine may be mechanically coupled to a turbocharger compressor. The turbocharger compressor may be configured to boost the pressure of the intake air charge supplied to the engine under selected conditions. Further, the exhaust conduit may conduct some of the exhaust to an exhaust-gas recirculation (EGR) system of engine system 10, via which a controlled portion of the exhaust is mixed into the intake air charge.

In the embodiments embraced by this disclosure, exhaust conduit 18 further conducts some or all of the exhaust to a series of exhaust-aftertreatment devices of engine system 10. The nature, number, and arrangement of the exhaust-aftertreatment devices may differ in the different embodiments of this disclosure. In general, the exhaust-aftertreatment devices may include at least one catalyst configured to catalytically treat the exhaust flow, and thereby reduce an amount of one or more substances in the exhaust flow. For example, one catalyst may be configured to trap nitrogen oxides ($NO_x$) from the exhaust flow when the exhaust flow is lean, and to reduce the trapped $NO_x$ when the exhaust flow is rich. In other examples, a catalyst may be configured to disproportionate $NO_x$ or to selectively reduce $NO_x$ with the aid of a reducing agent. In other examples, a catalyst may be configured to oxidize residual hydrocarbons and/or carbon monoxide in the exhaust flow. Further, at least one of the exhaust-aftertreatment devices may comprise a light-off catalyst and/or a three-way catalyst. Different catalysts having any such functionality may be arranged in wash coats or elsewhere in the exhaust-aftertreatment devices, either separately or together.

DPF 20 is arranged among the exhaust-aftertreatment devices of engine system 10 and is shown schematically in FIG. 1. The DPF is a regenerable soot filter configured to trap and oxidize particulate matter (e.g., soot) entrained in the exhaust flow. The DPF may include a honeycomb arrangement of hollow filtration cells (i.e., flow channels). Each cell in the DPF includes an exhaust-permeable partition which separates that cell from neighboring cells. The cells may each comprise a hexagonal-prismatic or rectangular-prismatic (e.g., square-prismatic) honeycomb cell structure. Further, the exhaust-permeable partition may include a catalyst wash coat that promotes oxidation of the accumulated soot under selected conditions. The catalyst wash coat may also exhibit other emissions-control functionality, as described hereinabove. In one particular embodiment, the catalyst wash coat may include a $NO_x$ reduction catalyst, wherein 'active oxygen' evolved during $NO_x$ reduction contributes to soot oxidation.

Continuing in FIG. 1, the various filtration cells of DPF 20 are grouped into two, structurally different and spatially segregated arrays—first array 22 and second array 24. In the illustrated embodiment, the first array is arranged downstream of the second array and is enclosed by exhaust-impermeable envelope 26. The exhaust-impermeable envelope is configured to transmit engine exhaust through the DPF—viz., through the first and second arrays and through radial diffusion zone 28. Arranged between the first and second arrays, the radial diffusion zone separates and cells of the first array from the cells of the second array and provides other functions, as further described hereinafter.

Figure 3:
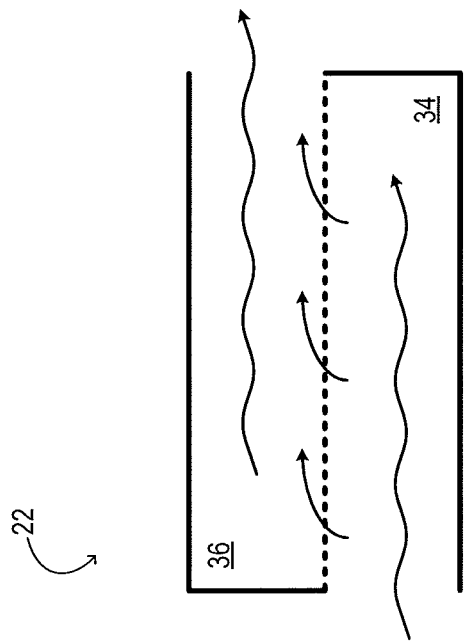
FIG. 3 schematically shows an exhaust flow pattern for an example DPF cell structure in accordance with an embodiment of this disclosure.
Figure 2:
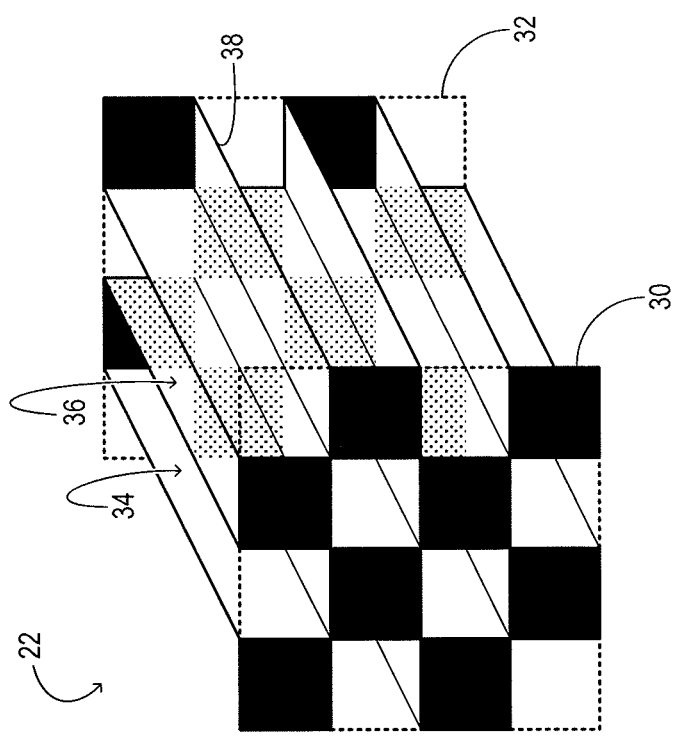
FIG. 2 schematically shows aspects of an example DPF cell structure in accordance with an embodiment of this disclosure.

FIG. 2 schematically shows aspects of an example internal cell structure of first array 22 in one embodiment. Each cell of the first array extends in length from first array inlet 30 to first array outlet 32. Each cell in the first array is open at one end and closed at the other. Adjacent cells are oriented alternately, such that a cell open at the first array inlet and closed at the first array outlet (e.g., cell 34) is adjacent neighboring cells closed at the first array inlet and open at the first array outlet (e.g., cell 36). Accordingly, exhaust entering a cell open at the first array inlet is forced to cross one or more of the exhaust-permeable partitions 38 into an adjacent cell open at the first array outlet. FIG. 3 schematically shows aspects of a simplified exhaust flow pattern in first array 22 in one embodiment.

Figures 4, 5:
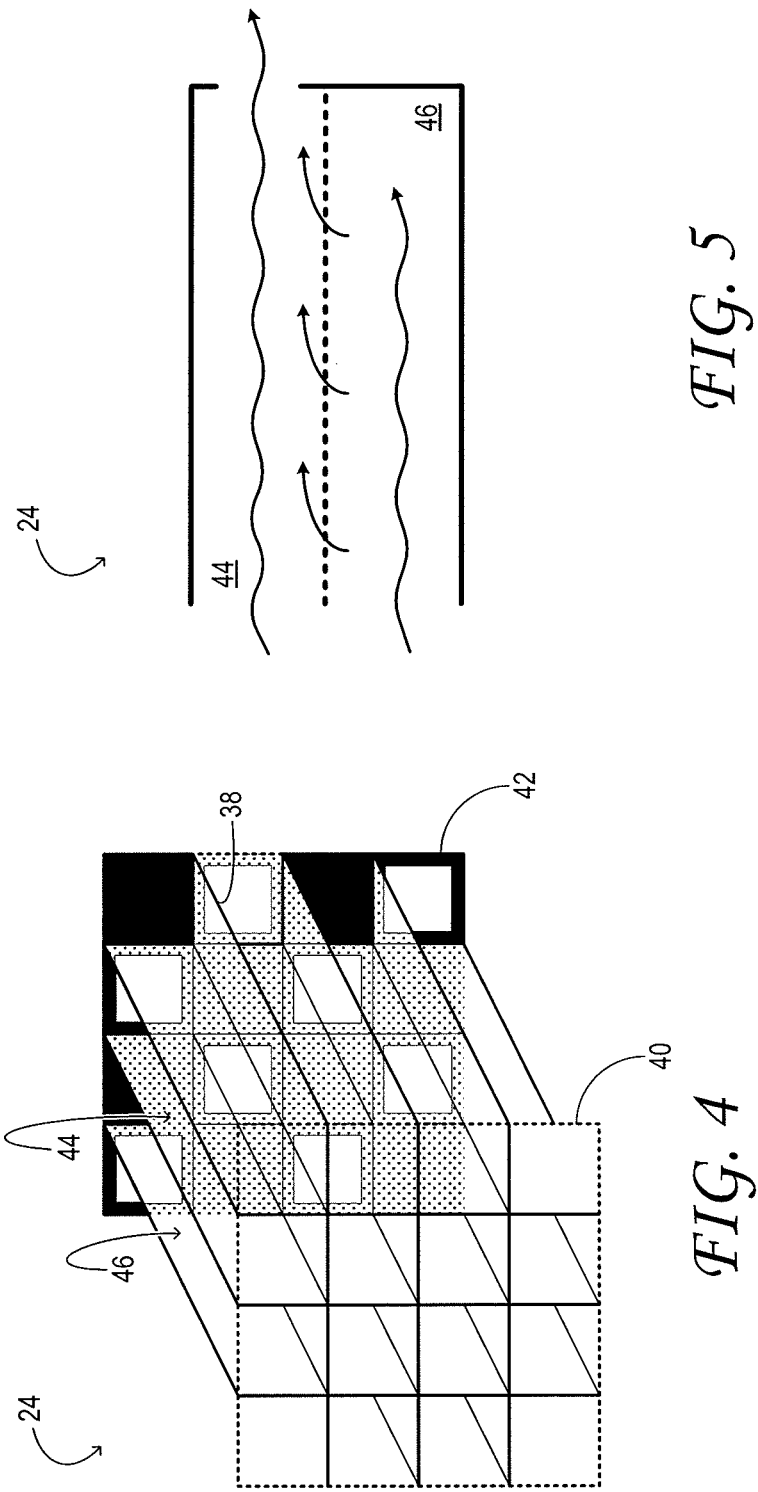
FIG. 4 schematically shows aspects of another DPF cell structure in accordance with an embodiment of this disclosure.
FIG. 5 schematically shows an exhaust flow pattern for another DPF cell structure in accordance with an embodiment of this disclosure.

FIG. 4 schematically shows aspects of an example internal cell structure of second array 24 in one embodiment. Each cell in the second array extends in length from second array inlet 40 to second array outlet 42. The cells of the second array are open at the second array inlet, where the exhaust is received, but may be closed or open at the second array outlet, opposite first array 22. Accordingly, the cells of the second array may have one or two open ends. Adjacent cells are oriented alternately, such that a cell open at the second array outlet (e.g., cell 44) is adjacent neighboring cells closed at the second array outlet (e.g., cell 46). Therefore, some exhaust may enter and exit the second array through the same fully open cell; the rest of the exhaust is forced to cross one or more of the exhaust-permeable partitions 38 into an adjacent fully open cell. FIG. 5 schematically shows aspects of a simplified exhaust flow pattern in second array 24 in one embodiment.

As shown in FIGS. 4 and 5, the cells of second array 24 may be sized or shaped unequally, so as to provide unequal flow areas therein. For example, the cells which are open at the second array outlet may provide a smaller flow area than the cells which are closed at the second array outlet. Relative to a second array in which the flow area of each cell is equivalent, the illustrated configuration provides reduced exhaust flow through the fully open cells and increased exhaust flow through the half-open cells. This configuration increases the capacity of the second array for accumulated soot.

In the particular embodiment shown in FIGS. 4 and 5, the flow areas in the fully and half-open cell differ because flow restrictor 48—shown as a frame in the drawings—is arranged at second array outlet 42. In particular, the flow restrictor is arranged on the cells open at the second array outlet. The flow restrictor thus limits the exhaust flow through the otherwise open cells. In another embodiment, a flow restrictor may be arranged at second array inlet 40 instead of or in addition to second array outlet 42. In other embodiments, an internal, flow-restricting structure may be arranged in each of the otherwise open cells. In still other embodiments, the fully open cells themselves may have a smaller cross-sectional area, with exhaust permeable partitions 38 being thicker or closer together, than in the half-open cells.

Returning now to FIG. 1, radial diffusion zone 28 is a void space inside envelope 26. Arranged between first array 22 and second array 24, the radial diffusion zone is configured to allow exhaust exiting the second array to flow radially (i.e., normal to the resultant direction of exhaust flow through envelope 26) before entering the first array. This action reduces the radial component of the pressure gradient in DPF 20 and enables the soot to accumulate more evenly in the radial direction.

As DPF 20 accumulates soot, its capacity for continued accumulation is naturally reduced. Further, a DPF operating with too much accumulated soot will impart excessive backpressure to the exhaust flow, which may degrade engine performance and fuel economy. DPF 20 is configured, therefore, to support one or more regeneration modes, which restore the capacity of the filter for continued soot trapping. Accordingly, electronic control system 16 is configured to determine when conditions are suitable for regenerating the DPF. To this end, the electronic control system may read information from one or more sensors arranged in engine system 10.

In FIG. 1, for example, backpressure sensor 50 is coupled in exhaust conduit 18 upstream of DPF 20. The backpressure sensor provides to electronic control system 16 a signal responsive to the internal pressure in exhaust conduit 18. When the internal pressure rises above a computed threshold, the electronic control system may, subject to other conditions, initiate regeneration of the DPF. To this end, the electronic control system may command electronic fuel injectors 14 to increase the temperature inside DPF envelope 26. For example, the electronic control system may command the fuel injectors to increase the amount of fuel injected into the combustion chambers of the engine and/or provide the fuel later in the combustion cycle (e.g., at a larger value of the crank angle) relative to normal operating conditions. This action may increase the temperature of the exhaust supplied to DPF 20 and/or entrain a greater portion of uncombusted fuel in the exhaust. Uncombusted fuel, when present, may oxidize exothermically on a catalyst wash coat of the DPF, thereby triggering a temperature increase which accelerates soot oxidation in the DPF. In one embodiment, DPF regeneration may be controlled in a closed-loop manner using exhaust temperature as a control variable. Accordingly, FIG. 1 shows temperature sensor 52 coupled in exhaust conduit 18 downstream of DPF 20. The temperature sensor provides to electronic control system 16 a signal responsive to the exhaust temperature downstream of the DPF. Accordingly, the electronic control system may, subject to other conditions, reduce the amount of injected fuel and/or advance the fuel-injection timing when the exhaust temperature exceeds a computed threshold. In this manner, the DPF 20 may be regenerated more reliably and with less risk of high-temperature excursion.

Figure 6:
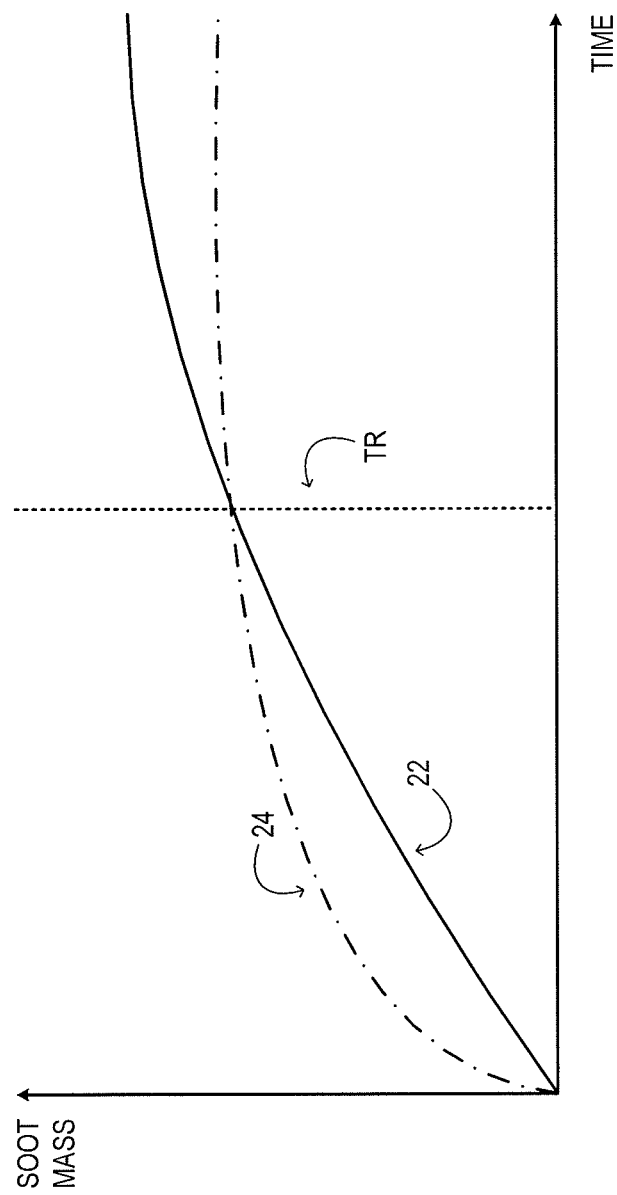
FIG. 6 illustrates an example accumulation of soot in upstream and downstream portions of a DPF in accordance with an embodiment of this disclosure.

The inventive internal structure of DPF 20 enables even more detailed thermal management to be applied during regeneration. In particular, DPF 20 may be configured to accumulate roughly equal amounts of soot in the first and second arrays. The labeled curves in FIG. 6 show predicted amounts of soot accumulated in first array 22 and second array 24 as functions of time, under controlled conditions. Such conditions include a constant rate of soot delivery to the inlet of the DPF at a constant flow rate of exhaust—e.g., an exhaust flow released at mid-range speed and load by an engine appropriately sized for the DPF. Initially, soot accumulates faster in the second array, but then a steady-state is reached wherein soot is deposited in and released from the second array at equal rates. Meanwhile, the mass of soot accumulated in the first array increases gradually from a low initial value. At the time marked TR on the graph, the same mass of soot has accumulated in the first and second arrays. Electronic control system 16 may be configured to initiate regeneration of the DPF at or around this time—i.e., in response to a determination that the amounts of soot in the first and second arrays have become equal, or nearly so. These amounts may be estimated by electronic control system 16, as described below.

FIG. 6 shows how soot accumulation in the first and second arrays evolves with time, but the relationships illustrated therein are readily expressed and used in other forms as well.

For instance, the predicted amounts of soot may be expressed instead as functions of total DPF backpressure—e.g., by measuring or estimating the backpressure at points along the abcissa of FIG. 6. Provided with such data and with sensor input responsive to backpressure, electronic control system 16 may be configured to assess and reassess the amounts of soot accumulated in the first and second arrays during engine operation. Accordingly, the electronic control system may be configured to initiate regeneration of the DPF when the amounts so assessed are equal or nearly so. In this manner, the DPF may be regenerated with a significantly reduced temperature gradient along its central axis. Reducing the temperature gradient may make the DPF less prone ring-off crack failure than a DPF of the same overall length, whose cells extend all the way from the inlet to the outlet.

The configurations described above enable various methods for removing soot from motor-vehicle engine exhaust using a regenerable soot filter. Accordingly, some such methods are now described, by way of example, with continued reference to above configurations. It will be understood, however, that the methods here described, and others fully within the scope of this disclosure, may be enabled via other configurations as well.

The methods presented herein include various measuring and/or sensing events enacted via one or more sensors disposed in the engine system. The methods also include various computation, comparison, and decision-making events, enacted in an electronic control system operatively coupled to the sensors. The methods further include various hardware-actuating events, which the electronic control system may command selectively, in response to the decision-making events.

Figure 7:
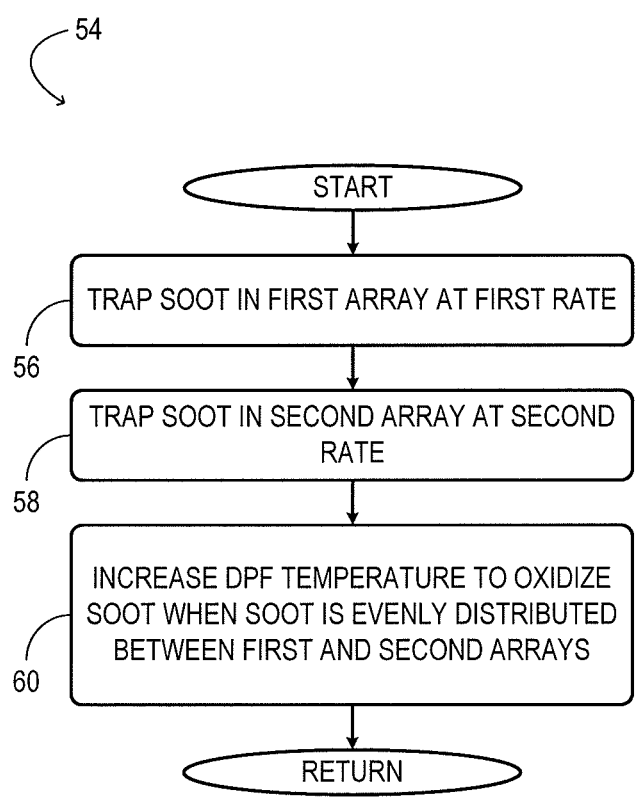
FIG. 7 illustrates a method for removing soot from motor-vehicle engine exhaust using a regenerable soot filter in accordance with an embodiment of this disclosure.

FIG. 7 illustrates an example method 54 for removing soot from motor-vehicle exhaust using a regenerable DPF in one embodiment. As described above, the DPF may comprise a first array of filtration cells enclosed in an envelope, downstream of a second array of filtration cells.

At 56, soot is trapped in a first (i.e., downstream) array at first rate. At 58 soot is trapped in second (i.e., upstream) array at second rate. The second rate may be initially greater than, but decrease faster than the first rate. In one embodiment, the difference in initial accumulation rates may be due at least partly to the upstream disposition of the second array relative to the first array. In this and other embodiments, the difference in the rate of change of the accumulation rates may be due at least partly to the second array including a plurality of fully open cells amid other half-open cells. Further, the soot trapping rate in the second array may be enhanced by the reduced flow area of the fully open cells of the second array relative to flow area of the half-open cells, as described hereinabove.

At 60 the temperature of the DPF is increased to oxidize accumulated soot in response to the soot becoming evenly distributed between first and second arrays. The point or interval when the soot is evenly distributed may be determined in various ways. It may be determined in an electronic control system based partly on the backpressure upstream of the DPF, in view of predetermined, predicted, and/or computed rates of soot accumulation in the first and second arrays as described hereinabove.

In this and other embodiments, the temperature of the DPF may be increased by commanding an increase in a fuel injection amount of one or more electronic fuel injectors of the engine. Accordingly, the fuel-injection timing may be varied to increase the amount of chemical or thermal energy released in the exhaust. In still other embodiments, a rate of auxiliary heating of the DPF—electrical heating, heating via a fuel-borne catalyst, etc.—may be increased when it is determined in the electronic control system that the soot is evenly distributed between the first and second arrays. From 60, the method returns.

Figure 8:
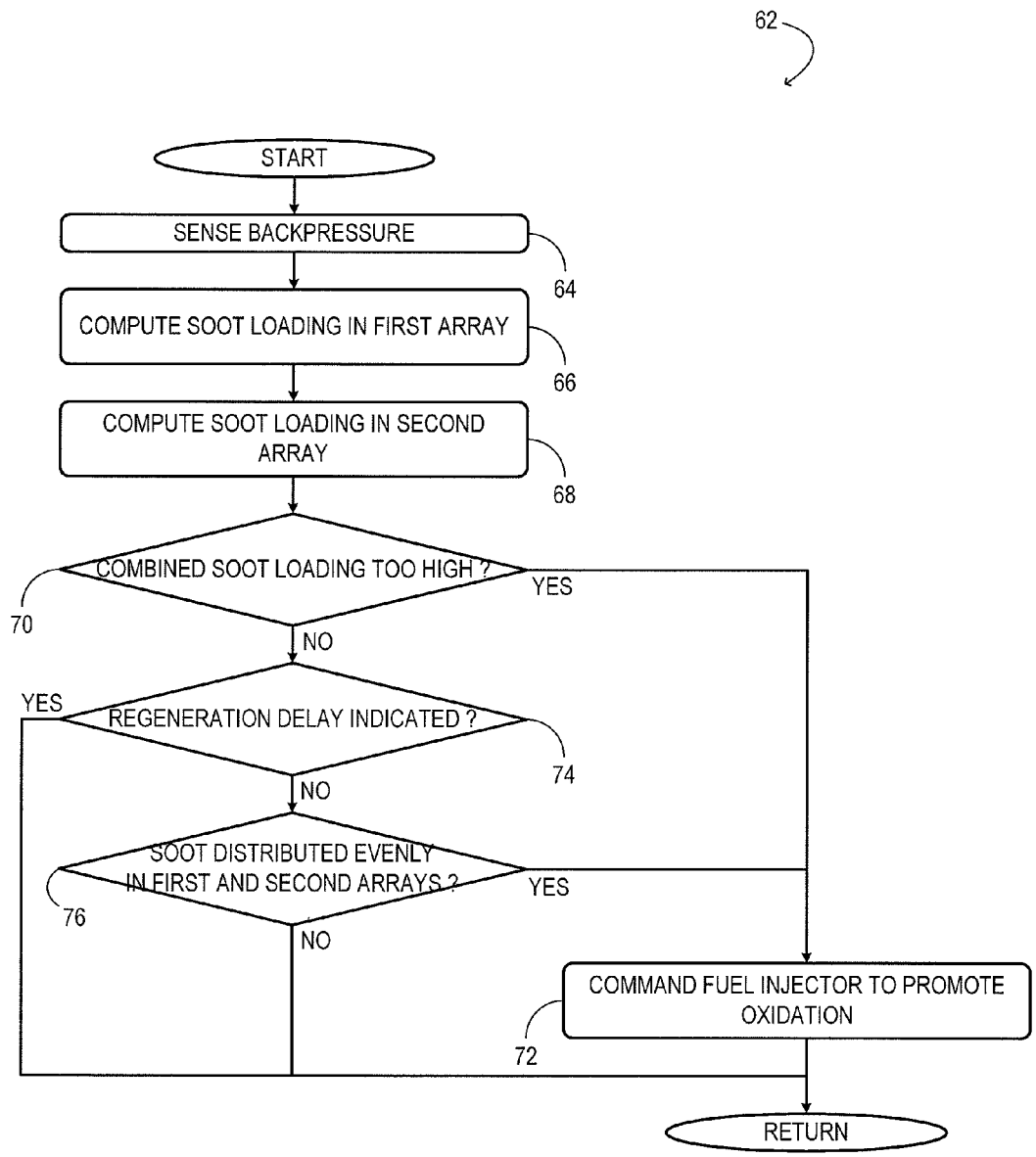
FIG. 8 illustrates a method for regenerating a DPF in accordance with an embodiment of this disclosure.

FIG. 8 illustrates an example method 62 for regenerating the DPF in one embodiment. The method may be entered upon any time the engine system is operating, and it may be executed repeatedly. Naturally, each execution of the method may change the entry conditions for a subsequent execution and thereby invoke a complex decision-making logic. Such logic is fully contemplated in this disclosure.

At 64 the exhaust backpressure upstream of the DPF is sensed. In one embodiment, the backpressure may be sensed via a backpressure sensor coupled upstream of the DPF, as described above. In another embodiment, the backpressure may be sensed indirectly, in view of one or more operating conditions of the engine. For example, the backpressure may be sensed based partly on engine speed and engine load. At 66 the soot loading in the first array is computed. At 68 the soot loading in the second array is computed. As noted above, the rates of soot accumulation in the first and second arrays may start at different initial values and may decrease at unequal rates. Soot loading in the first and second arrays may be computed based on the sensed backpressure, in view of predetermined, predicted, and/or computed rates of soot accumulation in the first and second arrays as described hereinabove. In one example embodiment, the electronic control system may access a look-up table in which predicted amounts of soot accumulated in the first and second arrays are indexed according to DPF backpressure. In another embodiment, other engine-system data—e.g., data revealing the progress of a previous DPF regeneration—may be accessed by the electronic control system and used to modify the predicted amounts.

At 70 it is determined whether the combined soot loading in the first and second arrays is too high—viz., whether the combined soot loading exceeds an upper threshold. If the combined soot loading is too high, then the method advances to 72, where regeneration takes place even if the amounts of soot accumulated in the first and second arrays are unequal. Thus regeneration is possible under conditions where the second array has accumulated more soot than the first array, and, under conditions where the first array has accumulated more soot than the second array. The latter scenario may be observed, for instance, after an incomplete regeneration (prematurely terminated due to engine shut down, for example). The regeneration rate in the second array may be greater than in the first array because of higher regeneration temperatures and more available oxygen, for example.

Returning now to FIG. 8, if the combined soot loading is not too high—does not exceed the upper threshold—then method 62 advances to 74. At 74 it is determined whether a regeneration delay is indicated. A regeneration delay may be indicated when the electronic control system determines that DPF regeneration could adversely affect engine-system performance. For example, transient high-load or cold-start conditions may cause a regeneration delay. If a regeneration delay is indicated, then the method returns. In this manner, regeneration may be delayed even when the soot is evenly distributed between the first and second arrays. However, if a regeneration delay is not indicated, then the method advances to 76.

At 76 it is determined whether the soot is distributed evenly in the first and second arrays, as described hereinabove. If the soot is distributed evenly in the first and second arrays, then the method advances to 72. However, if the soot is not distributed evenly, then the method returns.

At 72 one or more fuel injectors of the engine system are commanded to increase the DPF temperature to promote oxidation of the soot trapped in the DPF. The fuel injectors may be commanded to increase one or more of a fuel-injection amount and a fuel-injection retard, or the electronic control system may enact an alternative method (as indicated above in the context of method 54, for example) to increase exhaust temperature and initiate regeneration. In this manner, the fuel injectors may be commanded by the electronic control system to increase the temperature inside the DPF envelope when soot is evenly distributed between the first and second arrays. In one embodiment, the temperature downstream of the DPF may be sensed by reading a temperature sensor coupled downstream of the DPF. The fuel-injection amount or fuel-injection timing may be varied, accordingly, to exert closed-loop control of the sensed temperature. Via open- or closed-loop control, regeneration conditions may be continued for as long as needed in order for the soot loading in the first and second arrays to be reduced to a suitably low level. From 72, method 62 returns.

The example control and estimation routines disclosed herein may be used with various system configurations. These routines may represent one or more different processing strategies such as event-driven, interrupt-driven, multitasking, multi-threading, and the like. As such, the disclosed process steps (operations, functions, and/or acts) may represent code to be programmed into computer readable storage medium in an electronic control system.

Some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A system comprising:
   an envelope configured to transmit exhaust, the envelope enclosing a first array of filtration cells downstream of a second array of filtration cells, each cell of the first array having one open end and one closed end, each cell of the second array having one or two open ends;
   a fuel injector; and
   a computer readable storage medium in an electronic control system including code configured to trigger a temperature increase in the envelope via the fuel injector when soot is evenly distributed between the first and second arrays.

2. The system of claim 1 further comprising a backpressure sensor coupled in an exhaust conduit upstream of the envelope, wherein the code in the electronic control system is further configured to receive a signal from the backpressure sensor.

3. The system of claim 2 further comprising a temperature sensor coupled in an exhaust conduit downstream of the envelope, wherein the code in the electronic control system is further configured to receive a signal from the temperature sensor.

4. The system of claim 1, wherein each cell of the second array has an open end for receiving an exhaust flow opposite the open or closed end.

5. The system of claim 1, wherein each cell of the first and second arrays includes an exhaust-permeable partition which separates that cell from neighboring cells.

6. The system of claim 5, wherein the exhaust-permeable partition includes a catalyst wash coat.

7. The system of claim 6, wherein the catalyst wash coat includes a $NO_x$ reduction catalyst.

8. The system of claim 1, wherein the envelope also encloses a radial diffusion zone arranged between the first and second arrays.

9. The system of claim 8, wherein the radial diffusion zone comprises a void space that separates the first array from the second array.

10. The system of claim 1, wherein some cells of the second array have a closed end opposite the first array and the rest of the cells of the second array have an open end opposite the first array, and wherein the cells with a closed end opposite the first array admit of a larger flow area than the cells with an open end opposite the first array.

11. The system of claim 10, wherein each cell with an open end opposite the first array includes a flow restrictor.

12. A method for removing soot from motor-vehicle exhaust using a regenerable soot filter, the filter comprising a first array of filtration cells enclosed in an envelope downstream of a second array of filtration cells, the method comprising:
   trapping the soot in the first array at a first rate;
   trapping soot in the second array at a second rate, the second rate decreasing faster than the first rate; and
   increasing a temperature in the envelope to oxidize the soot when the soot is evenly distributed between the first and second arrays.

13. The method of claim 12, wherein each cell of the first array has one open end and one closed end and is oriented such that the open end is adjacent one or more closed ends of neighboring cells of the first array.

14. The method of claim 12, wherein each cell of the second array has an open or closed end opposite the first array and is oriented such that each closed end is adjacent one or more open ends of neighboring cells of the second array.

15. The method of claim 12 further comprising radially diffusing the exhaust between the first and second arrays.

16. The method of claim 12, wherein increasing the temperature in the envelope comprises sensing a backpressure upstream of the filter and increasing the temperature when the backpressure exceeds a threshold.

17. The method of claim 12, wherein increasing the temperature in the envelope comprises sensing a temperature downstream of the filter and varying one or more of a fuel-injection amount and a fuel injection timing to exert closed-loop control of the sensed temperature.

18. A method for operating a soot filter comprising a first array of filtration cells enclosed in an envelope downstream of a second array of filtration cells, comprising:
   trapping soot in the first array at a first rate while,
   trapping soot in the second array at a second rate decreasing faster than the first rate; and
   increasing an envelope temperature to oxidize the soot when the soot is evenly distributed between the first and second arrays.

* * * * *